United States Patent [19]
Yamamoto et al.

[11] 3,821,327
[45] June 28, 1974

[54] BLENDS OF GRAFT COPOLYMERS CONTAINING AN ALKYL ACRYLATE-ALKYLTHIOALKYL METHACRYLATE BACKBONE WITH POLYVINYL CHLORIDE

[75] Inventors: Roy I. Yamamoto, Wappingers Falls; Carmen M. Cusano, Poughkeepsie; Isaac D. Rubin, Wappingers Falls, all of N.Y.

[73] Assignee: Texaco Inc., New York, N.Y.

[22] Filed: Oct. 25, 1972

[21] Appl. No.: 300,545

[52] U.S. Cl. .................. 260/876 R, 260/29.6 RB, 260/45.75 R, 260/45.9 R, 260/45.95 R, 260/79.7, 260/881, 260/23 AR, 260/23 S
[51] Int. Cl. ..................... C08f 15/00, C08f 15/40
[58] Field of Search ....................... 260/881, 876 R

[56] References Cited
UNITED STATES PATENTS
3,691,261  9/1972  Cusano et al. .................... 260/881

*Primary Examiner*—John C. Bleutge
*Assistant Examiner*—Richard B. Turer
*Attorney, Agent, or Firm*—Thomas H. Whaley; C. G. Reis

[57] ABSTRACT

An ultraviolet light and fire resistant thermoplastic composition exhibiting good heat deflection temperature, tensile strength and elastic modulus properties comprising:

1. between about 50 and 75 wt. percent of a terpolymer resin characterized as a rubbery copolymer backbone of a $C_2$ to $C_{18}$ alkyl acrylate and alkylthioalkyl methacrylate having grafted thereon an acrylonitrile-styrene member copolymer,
2. between about 50 and 25 wt. percent of a polyvinyl chloride having a specific viscosity between about 0.30 and 0.60 and,
3. between about 0 and 10 wt. percent of a syngeristic fire retarding metal salt, said graft terpolymer formed by polymerizing a mixture of said alkyl acrylate and alkylthioalkyl methacrylate under aqueous emulsion polymerization conditions at a pH between about 2–7 at a first temperature between about 110° and 150° C. under vigorous agitation conditions to form the rubbery copolymer of alkyl acrylate and ethylthioethyl methacrylate, then second polymerizing within said polymerization conditions said polymer with a mixture of acrylonitrile and styrene member.

5 Claims, No Drawings

BLENDS OF GRAFT COPOLYMERS CONTAINING AN ALKYL ACRYLATE-ALKYLTHIOALKYL METHACRYLATE BACKBONE WITH POLYVINYL CHLORIDE

CROSS REFERENCES

Coassigned, copending applications Ser. Nos. 120,069, filed Mar. 1, 1971, now U.S. Pat. No. 3,691,261, and 123,010, filed Mar. 10, 1971.

BACKGROUND OF INVENTION

This invention pertains to the area of synthetic resin art relating to thermoplastic compositions resulting from the reaction of a vinylidene aromatic and acrylonitrile with a copolymer of an unsaturated carboxylic acid and an alkylthioalkyl methacrylate in combination with a polyvinyl chloride and optionally in further combination with a metal salt which synergistically enhances fire resistance.

Graft polymers of acrylonitrile, butadiene and styrene are well known and widely used synthetic resins. They are commonly referred to in the art as ABS thermoplastic materials. They are composed of polybutadiene rubbery backbone on which is grafted a styrene and acrylonitrile copolymer. Described in another manner, ABS resins are looked upon as dispersions of a rubbery phase polybutadiene in a rigid matrix of styrene-acrylonitrile copolymer, the copolymer being chemically bound to the rubber phase.

The graft ABS resins due to their excellent resistance to impact and heat deformation and good elasticity and tensile strength are useful as plastic materials for refrigerators, shoe heels, telephones, plastic pipes, machine housing, etc. These physical properties of the ABS resin are normally measured in terms of Izod Impact (ASTM D-256), Heat Deflection Temperature (ASTM D-648), Elastic Modulus (ASTM D-638), Tensile Strength (ASTM D-638) and Elongation (ASTM D-638).

Many variations of the basic ABS resins have been developed in the art. One outstanding variation in the ABS resin family is the thermoplastic polymers described in the aforementioned application, Ser. No. 120,069, which covers a thermoplastic resin comprising an alkyl acrylate and ethylthioethyl methacrylate rubbery backbone having grafted thereon an acrylonitrile-styrene member backbone. Although this resin has outstanding structural and UV (ultraviolet light) resistant properties, one of its deficiencies as with many of the resins in the ABS family is that it tends to be flammable. In an effort to solve the flammability problem, many approaches were taken such as copolymerization of various flame retardant monomers with the acrylonitrile-styrene member matrix. Examples of such monomers are pentachlorophenyl methacrylate, bis(2-chloroethyl) vinyl phosphonate, 4-vinylpyridine, dichloromaleic anhydride, vinylidene chloride, vinyl-2-chloroethyl ether, alpha-bromostyrene and dichlorodiethyl maleate. Although these approaches resulted in an ABS type resin of reduced flammability, they often caused substantial deterioration in the physical properties of the product resin, e.g., impact, heat deformation, elasticity, tensile strength and/or UV resistance in a sufficient degree to render the resin unsuitable as structural materials.

SUMMARY OF INVENTION

We have discovered and this constitutes our invention a thermoplastic resin composition of improved fire resistance which has superior mechanical properties in terms of impact strength, heat deflection temperature, elastic modulus, tensile strength, elongation and resistance to UV exposure. More specifically, we have discovered a thermoplastic terpolymer resin which is not only outstanding in respect to mechanical properties and ultraviolet light deterioration but also fire resistant, this being accomplished without detracting from said outstanding properties, said terpolymer consisting essentially of a rubbery backbone copolymer of a $C_2$ to $C_{18}$ alkyl acrylate and alkylthioethyl methacrylate wherein the alkyl groups in said methacrylate have 1–10 carbons, said backbone having grafted thereon a copolymer of acrylonitrile and a styrene member selected from the group consisting of styrene and alphamethylstyrene.

Composition

Specifically, we have discovered a fire resistant composition of superior structural and UV resistant properties consisting essentially of 1). between about 50 and 75 wt. percent of a graft terpolymer consisting essentially of $C_2$ to $C_{18}$ alkyl acrylate (AA) and alkylthioalkyl methacrylate (ATAMA) rubbery backbone wherein the alkyl in said methacrylate is of from 1 to 10 carbons having grafted thereon a copolymer of acrylonitrile (A) and a styrene member (SM) of styrene (S), alpha-methylstyrene (AMS) and mixtures thereof with said rubbery backbone, said alkyl acrylate component to said alkylthioalkyl methacrylate weight ratio being between about 90:10 and 99:1 and the weight ratio of A:AA-ATAMA:SM being about 15-30:15-35:50-70, 2). between about 50 and 25 wt. percent of a polyvinyl chloride having a specific viscosity of between about 0.30 and 0.60 and 3). between about 0 and 10 wt. percent of a metal salt selected from the group consisting of the oxides and sulfides of antimony, arsenic and bismuth.

Composition Preparation

The fire resistant composition is prepared by first blending polyvinyl chloride and a heat stabilizer by introducing a mixture of polyvinyl chloride and stabilizer into a roll mill to produce a PVC-stabilizer crepe. The roll mill is advantageously adjusted to a temperature between about 350°–380° F. operating at a rate of between about 15–40 ft./minute. Residence time of the blend on the mill is minimal, normally less than 2 minutes. The heat stabilizer's function is to prevent the decomposition of the polyvinyl chloride during processing and is employed in a concentration of between about 2 and 12 parts per hundred resin (phr).

As a second step the acrylate-methacrylateacrylonitrile-styrene member terpolymer resin component and metal fire resisting salt (if used) are introduced to a roll mill maintained at between about 360° and 400° F. operating at a rate of between about 15–40 ft./minute and the graft polymer is milled for between about 6–12 minutes. To promote the processability of the blend and to minimize deleterious effects on mechanical properties a lubricant is advantageously employed. When the lubricant (e.g., calcium stearate, stearic acid) does not adversely affect the milling process, the lubricant is introduced initially. However, when the lubricant (e.g., waxes, mineral oil, low density polyethylene, chlorinated paraffin wax) adversely affects the milling of the resin, that is, reduces the adhesion of the crepe to the roll mill the lubricant is added after the terpolymer component is formed on the roll mill. The lubricant is normally utilized in concentrations of between about 0.5 and 4 phr and is introduced with other ingredients on the mill.

Following the milling of the terpolymer component, the polyvinyl chloride-heat stabilizer crepe produced in the aforementioned first blending is rapidly introduced on the roll mill containing the milled terpolymer (and the metal salt fire resisting enhancer is used) and milling is continued under conditions of the second stage for an additional period of time, e.g., 3 to 4 minutes, thereby producing the desired composition.

Graft Terpolymer Component

The graft terpolymer ingredient normally is prepared utilizing a two stage polymerization procedure as follows:

In the first stage water polymerization initiator and anionic emulsifier, alkyl acrylate and alkylthioethyl methacrylate are charged to an oxygen gas free reactor and the pH of the resultant mixture is adjusted to between about 2 and 7. Normally, the water content ranges between about 50 and 80 wt. percent of the first polymerization mixture and the total alkyl acrylate and methacrylate content is between about 20 and 50 wt. percent. The reaction temperature is adjusted to between about 110° and 150° F. and the mixture is vigorously agitated until an emulsion is formed whereupon the agitation is advantageously reduced to between about one-fifth and one-twentieth of the original rate but continued in a sufficient extent to insure less than about a ± 5° F. temperature variation during the reaction period. Advantageously, the polymerization is conducted in an inert atmosphere, e.g., nitrogen. A reaction pressure between about 15 and 50 psig is advantageously maintained throughout the first stage polymerization. The polymerization is conducted until a crosslinked rubbery copolymer of alkyl acrylate and alkylthioalkyl methacrylate is formed being characterized by a conversion of 80–100 wt. percent basis starting components. The rubbery copolymer is highly branched being insoluble in such solvents as methylethylketone and toluene. The period of first polymerization is advantageously between about 1 and 5 hours. The weight ratio of alkyl acrylate to alkylthioalkyl methacrylate employed in said first polymerization is normally between about 90:10 and 99:1.

Examples of the alkyl acrylate monomer reactant contemplated herein are ethyl acrylate, butyl acrylate, octyl acrylate, dodecyl acrylate and octadecyl acrylate.

Examples of alkylthioalkyl methacrylates contemplated herein are ethylthioethyl methacrylate, butylthiobutyl methacrylate, ethylthiooctyl methacrylate and propylthiodecyl methacrylate.

At the end of the first stage polymerization, the rubbery copolymer intermediate crude latex product is worked up by standard means such as adding a chain stopper to the crude latex and then filtering the reaction mixture to remove any coagulant. The coagulant is discarded and the filtrate, normally of a heavy cream type consistency, is passed on to the second stage of the polymerization procedure.

In the second stage polymerization the filtrate containing alkyl acrylate-alkylthioalkyl acrylate rubbery backbone copolymer from the first stage is charged to a reactor, advantageously oxygen free, together with anionic emulsifier, polymerization initiator and modifier, acrylonitrile and the styrene member and additional water if necessary to obtain an aqueous solution which is normally between about 45 and 75 wt. percent water. The pH is adjusted to between about 2 and 7. The weight ratio of acrylonitrile to rubbery copolymer backbone to styrene member employed in the second polymerization is advantageously about 15–30/15–35/50–70. The contents of the reactor are vigorously agitated and adjusted to a temperature between about 110° and 150° F. and advantageously a pressure of between about 15 and 50 psig. The high rate of agitation is continued until an emulsion is formed and then the agitation is reduced to between about one-twentieth and one-seventh of the previous rate sufficient to insure less than about ± 5° F. temperature variation throughout the second polymerization mixture. The reaction is continued under reduced agitation conditions, e.g., until the aforedescribed terpolymer component is formed which is normally between about 1.5 and 24 hours.

The terpolymer component is recovered from the reaction mixture by standard means such as coagulating the emulsion by addition into methanol and filtering. The recovered coagulated solids are washed and dried and then sent on for milling and molding for use. The molecular weight of the individual terpolymer molecules in the component range is between about 100 and 500,000.

The quantities of polymerization initiator employed in the first and second polymerization stages range between about 0.01 and 1 wt. percent (basis monomers) depending on the particular initiator involved. Examples of the initiators contemplated herein are the water soluble polymerization initiators such as hydrogen peroxide, sodium peroxide, sodium perborate, sodium persulfate and the potassium and ammonium salts of the foregoing and other peroxy agents and water soluble compounds containing the peroxy radical (—O—O—). Normally, the water soluble polymerization initiator of potassium persulfate is preferred. In addition, organic hydroperoxides may be utilized in combination with a reducing agent such as diisopropylbenzene hydroperoxide in combination with dextrose, sodium pyrophosphate and ferrous sulfate. This latter system is commonly referred to as a redox system.

The anionic emulsifiers are employed in both polymerization stages in amounts normally between about 0.3 and 5 wt. percent of the polymerization mixture, the exact amount being determined by the particular reaction mixture employed. Examples of anionic emulsifiers contemplated herein are the water soluble salts of fatty acid such as sodium and potassium salts of stearic, lauric, myristic, palmitic and oleic acids as well as the resin soap salts. Additional examples of alkali metal salts are the alkali metal salts of sulfonated hydrocarbons such as sodium lauryl sulfonate, sodium dodecyl sulfonate and sodium dodecyl benzene sulfonate. The function of the emulsifier as denoted in the name is to maintain the reactants and products in aqueous emulsion.

The polymerization modifiers are employed in the first and second stage in amounts between about 0.15 and 0.8 wt. percent based on the particular reaction mixture employed. Among the modifiers contemplated are the alkyl mercaptans of 12 to 16 carbons such as n-dodecylmercaptan, t-hexadecylmercaptan, a mixture of t—$C_{12}$—$C_{16}$ alkyl mercaptan. In addition, other examples are dihydrocarbyl disulfides wherein the hydrocarbyl group is from 1 to 16 carbons including alkaryl, aryl, alkyl and aralkyl such as dibutyl disulfide, diphenyl disulfide, dibenzyl disulfide and ditolyl disulfide. The modifiers function to regulate the molecular weight from the product.

The chain stoppers employed function to terminate polymerization by eliminating the free radicals present and are normally incorporated in the final mixture in amounts of the order of about 0.1 wt. percent and at the end of the reaction period examples of the chain stoppers contemplated herein are sodium dimethyl dicarbamate, sodium diethyl dithiocarbamate, sodium dithionite, hydroquinone, phenylhydrazine and sodium sulfide.

To the intermediate or final resin component there may be added standard additives such as antioxidants and stabilizers, e.g., di-t-butyl-p-cresol and phenyl-beta-naphthylamine and tris(nonylphenyl) phosphite. These stabilizers are generally incorporated in the final resin in amounts of between about 0.4 and 1 wt. percent, preferably before the recovery of the resin component from the final emulsion.

Polyvinyl Component

The polyvinyl chloride resin component employed is a high molecular weight resin in particulate form which can be prepared either by emulsion or mass suspension techniques. The particle size thereof can range anywhere from 0.5 micron to 200 microns. The molecular weight of the polyvinyl chloride resin is proportional to its specific viscosity. The polyvinyl chloride material contemplated herein possesses a specific viscosity of at least about 0.30 and up to about 0.60.

Examples of the heat stabilizers employed in the blending of the composition of the invention are the sulfur containing organo tin compounds disclosed in U.S. Pat. Nos. 2,648,650, 2,726,227 and 2,726,254.

Metal Salt Component

Specific examples of the optional metal salt components are $As_2S_3$, $As_2O_5$, $As_2S_5$, $Sb_2O_3$, $Sb_2S_3$, $Sb_2O_4$, $Sb_2S_4$, $Sb_2O_5$, $Sb_2S_5$, BiO, BiS, $Bi_2O_3$, $Bi_2S_3$, $Bi_2S_4$, $Bi_2O_4$, $Bi_2O_5$ and $Bi_2S_5$. These salts are employed in the finely divided state.

As to material features regarding the fire and UV resistant compositions contemplated herein, the particular combination of components as herein defined is required in order to obtain a joinder in a single composition of outstanding physical properties (impact, heat deflection, elasticity, tensile strength) coupled with superior fire and ultraviolet light deterioration resistance. Other combinations of components known to form fire resistant ABS type resins did not form the combination of outstanding properties as is found in the novel composition contemplated herein.

Hereinafter the physical values of the resin set forth are based on compression molded structures.

The following examples further illustrate the composition of the invention but are not to be construed as limitations thereof.

EXAMPLE I

This example illustrates the preparation of the rubbery copolymer backbone of the graft terpolymer component of the composition contemplated herein.

The polymerization recipe for Stage 1 of the graft terpolymer preparation method, that is, preparation of the rubbery copolymer of alkyl acrylate and alkylthioalkyl methacrylate is presented below in Table I:

TABLE I

| Polymerization Recipe — Stage 1 | |
|---|---|
| Ingredients | Grams |
| Ethylthioethyl Methacrylate | 7 |
| Ethyl Acrylate | 93 |
| Potassium Persulfate | 0.25 |
| Sodium Bisulfite | 0.08 |
| Sodium Lauryl Sulfate Aq. Sol., (1:2 sulfate to $H_2O$) | 5 |
| Water | 200 |

In the procedure of the first stage the persulfate was dissolved in water and added to the reactor together with sodium bisulfite and sodium lauryl sulfate. The mixture was stirred at 150 rpm and purged with nitrogen. To the mixture there was added ethyl acrylate and ethylthioethyl methacrylate. The contents of the reactor were stirred at a rate of 1,500 rpm for 5 minutes. The stirring rate was then reduced to 250 rpm and heat was applied and the temperature increased to 144° F. The reactor was kept at 144 ± 5° F. for 1.5 hours. The entire polymerization reaction in the first stage was conducted under a blanket of nitrogen. The product was recovered as a latex. The yield of latex product was about 96 wt. percent. The rubbery backbone copolymer product was determined to be very highly branched basis solubility data which demonstrated it swelled but did not dissolve in methylethyl ketone and toluene. Further analysis of the first stage product is found in Table II below:

TABLE II

| Rubbery Copolymer | |
|---|---|
| Component | Wt. % |
| Ethylthioethyl Methacrylate | ~7 |
| Ethyl Acrylate | ~93 |

EXAMPLE II

This example illustrates the preparation and grafting acrylonitrile-styrene member copolymer on the alkyl acrylate-alkylthioalkyl methacrylate rubbery backbone utilizing the ethyl acrylate-ethylthioethyl methacrylate latex precursor prepared in Example I. The recipe for the second stage polymerization and reaction conditions for the second stage is set forth below:

TABLE III

| Polymerization Recipe - Stage 2 | | | | |
|---|---|---|---|---|
| Ingredient | A | B | C | D |
| Latex of Ex. I, g. | 80 | 89 | 56 | 62 |
| Potassium Persulfate, g. | 0.15 | 0.15 | 0.26 | 0.25 |
| Sodium Bisulfite, g. | 0.05 | 0.05 | 0.08 | — |

TABLE III-Continued

| Ingredient | Polymerization Recipe - Stage 2 | | | |
|---|---|---|---|---|
| | A | B | C | D |
| Antioxidant,* ml. | 1.1 | 1.1 | 1.1 | 2.3 |
| Alkylated benzyl ammonium chloride, ml. (50 wt. % $H_2O$ + ethanol) | — | — | — | 6.0 |
| Sodium Alkaryl Sulfonate (20 g/liter $H_2O$), ml. | 100 | 100 | — | — |
| Sodium alkylsulfate, g. | — | — | 5.0 | — |
| Acrylonitrile, g. | 25 | 25 | 28 | 27 |
| Styrene, g. | 50 | 50 | — | — |
| Alpha-Methylstyrene, g. | — | — | 55 | 53 |
| t-Hexadecyl Mercaptan, g. | 0.3 | 0.3 | 0.34 | 0.33 |
| Sodium Hydroxide Sol. (5g/100 ml. $H_2O$), ml. | 3.0 | 3.0 | — | — |
| Rinse Water, ml. | 54 | 61 | 61 | 202 |

*1/1.5/0.5 wt. ratio of tri(mixed mono and di-nonylphenyl) phosphite, hindered phenol, di-tridecyl thiodipropionate.

The following table sets forth the reaction conditions employed in the polymerization of the above recipes:

TABLE IV

| Description | REACTION CONDITIONS Temp., °F. (°C.) | Time, Hrs. |
|---|---|---|
| Run A | 149 (65) | 2 |
| Run B | 149 (65) | 2 |
| Run C | 149 (65) | 2 |
| Run D | 149 (65) | 5 |

In the second stage polymerization the potassium persulfate and sodium bisulfate were dissolved in sodium alkaryl sulfonate soap. To the resultant solution sodium hydroxide, t-hexadecylmercaptan, styrene or alpha-methylstyrene and acrylonitrile monomer were added and the mixture was well shaken and charged together with the remaining soap solution and water into the reactor. The reactor was sealed and purged with nitrogen and the contents of the reactor were stirred at 250 rpm at the reaction temperatures. At the end of this period antioxidant was then stirred into the reactor and the reactor was emptied under nitrogen pressure. Portions of the resultant latex of the terpolymer composition were coagulated by pouring into methanol and the coagulated resin was filtered, dried and the portions were submitted for testing. Analysis of the terpolymer compositions found yields of terpolymer were essentially quantative and the component analysis approximated the charge ratios.

The graft terpolymer resulting from Runs A, B, C and D were further tested as to mechanical and UV resistant properties together with commercially sold comparative Composition E (acrylonitrile-butyl acrylate-styrene graft terpolymer). The results are reported below in the following Table V:

TABLE V

| Description | ANALYSIS AND PROPERTIES | | | | |
|---|---|---|---|---|---|
| | A | B | C | D | E |
| A:EA-ETEMA:SM wt. ratio | 25:25:50 | 25:25:50 | 28:17:55 | 27:20:53 | — |
| Izod Impact (ASTM D-256) | 3.4 | 10.4 | 0.6 | 4.2 | 1.4 |
| Heat Deflection, Temp., °C. (ASTM D-648 264 psi) | | | | | |
| .01" | 87 | 84 | 104 | 102 | 79 |
| .02" | 92 | 90 | 108 | 106 | 81 |
| E. Mod. $\times 10^{-3}$ psi (ASTM D-638) | 282 | 235 | 319 | 287 | 246 |
| Tensile Strength (at yield), psi (ASTM D-638) | 6370 | 5410 | 4800 | 4030 | 5210 |
| % Elongation (ASTM D-638) | 17 | 5 | 2 | 1 | 14 |
| % Izod Impact Retained after 228 hrs. UV exposure, Apprx. | 75+ | 75+ | 75+ | 75+ | 57 |

EXAMPLE III

This example further illustrates the preparation of the graft terpolymer component of the composition of the invention untilizing alpha-methylstyrene as an ingredient and importance of the conditions in the method of preparation.

The procedure of Example I was employed to form the EA-ETEMA rubbery backbone. The overall procedure of Example II was essentially employed to form the finished graft terpolymer component except the temperature and time have been varied. The following table demonstrates the relationship between physical properties of the graft terpolymer component and the reaction conditions in the second state polymerization forming the graft terpolymer component.

TABLE VI

ALPHA-METHYLSTYRENE TERPOLYMER DERIVATIVE

| Description | Graft Terpolymer | Graft Terpolymer |
|---|---|---|
| Graft Terpolymer Comp., wt. ratio A:EA-ETEMA:AMS | 28:17:55 | 27:20:53 |

TABLE VI—Continued

ALPHA-METHYLSTYRENE TERPOLYMER DERIVATIVE

| Description | Graft Terpolymer | Graft Terpolymer |
|---|---|---|
| Stage II Pol. Cond. | | |
| Temp., °F. | 113 | 151 |
| Time, Hrs. | 24 | 7 |
| Properties Terpolymer | | |
| Izod Impact, ft/lb./in. notch | 1.1 | 0.5 |
| Heat Deflection, Temp., °C | 104 | 104 |
| E. Modulus, $X10^{-3}$ psi | 325 | 258 |
| Tensile Strength, psi | 6300 | 3800 |

EXAMPLE IV

This example illustrates the novel compositions of the invention and the preparation thereof.

To a 6 inch roll mill operated at about 370° F. at a rate of 30 ft./minute, there was charged polyvinyl chloride (PVC) of a specific viscosity of about 0.5 and organo tin mercaptide heat stabilizer (Thermolite 31 manufactured by M&T Chemical Co.) and the resultant mixture was milled for about a minute to produce a PVC-stabilizer crepe and this first crepe was set aside.

Then to the 6 inch roll mill maintained at about 380° F. at 30 ft./minute the terpolymer products prepared in Example II were charged in separate runs together with 2 phr calcium stearate and milled for about 8 minutes whereupon the first crepe previously prepared was added in the quantity desired. Milling was continued for about 3 minutes to produce a blended crepe of the compositions of the invention. The resultant blended compositions were then compression molded using a 6 inch diameter circular mold at 25–30 tons at 370° F. The compression molded samples were then subjected to testing and the formed compositions and the testing results therefor are reported below:

TABLE VII

PROPERTIES OF FIRE RESISTANT COMPOSITION

| Description | A | B | C | D | E[2] |
|---|---|---|---|---|---|
| Composition | | | | | |
| Graft Terpolymer Component of Ex. II | A | B | C | D | E |
| Wt. Ratio Graft:PVC | 50:50 | 50:50 | 50:50 | 50:50 | 50:50 |
| Properties | | | | | |
| Izod Impact, ft/lb/in. notch | 0.71 | 0.9 | 0.5 | 0.7 | 2.6 |
| Heat Deflection Temp., °C .01" | 71 | 60 | 77 | 75 | 69 |
| .02" | 76 | 65 | 81 | 79 | 73 |
| Elastic Modulus, psi $X10^{-3}$ | 280 | 252 | 348 | 333 | 277 |
| Tensile Strength, psi | 5310 | 4200 | 8000 | 7470 | 6140 |
| % Elongation | 47 | 55 | 14 | 23 | 60 |
| % Izod after 228 hrs. UV exposure, approx. | 75+ | 75+ | 75+ | 75+ | 57 |
| Flammability ASTM D-635 | S.E.[1] | S.E.[1] | S.E.[1] | S.E.[1] | Fail |

[1] Self Extinguishing
[2] Comparative example using commercial Resin E

We claim:

1. A fire resistant composition comprising:
   a. between about 50 and 75 wt. percent of a thermoplastic graft terpolymer consisting of a $C_2$ to $C_{18}$ alkyl acrylate-alkylthioalkyl methacrylate first copolymer rubbery backbone wherein the alkyl groups in said methacrylate are of from 1 to 10 carbons and said alkyl acrylate and said alkylthioalkyl methacrylate are present in the weight ratio of between about 90:10 and 99:1, said backbone having grafted thereon an acrylonitrile-styrene member graft second copolymer, said styrene member being selected from the group consisting of styrene, alpha-methylstyrene and mixtures thereof, said acrylonitrile, said rubbery backbone and said styrene member being present in a weight ratio of about 15–30:15–35:50–70 of acrylonitrile:alkylacrylate:alkylthioalkyl methacrylate:styrene member, said thermoplastic graft terpolymer being prepared by first contacting under aqueous emulsion polymerization conditions said alkyl acrylate with said alkylthioalkyl methacrylate utilizing a weight ratio of said alkyl acrylate to said alkylthioalkyl methacrylate of between about 90:10 and 99:1 in the presence of water polymerization initiator and anionic emulsifier to form an aqueous mixture containing said first copolymer, said first polymerization being conducted at a pH between about 2 and 7 at a temperature between about 110° and 150° F. in the absence of oxygen under conditions of vigorous agitation sufficient to form an emulsion and sufficient to limit the reaction temperature variation to less than ± 5° F., then second polymerizing under aqueous emulsion conditions said formed first copolymer with a mixture of acrylonitrile and styrene member in the presence of water, polymerization initiator, polymerization modifier and a second anionic emulsifier, said second polymerization being conducted at a pH of between about 2 and 7 at a temperature between about 110° and 150° F. in the absence of oxygen under vigorous conditions and sufficient agitation to maintain the temperature within a range throughout the reaction mixture to less than ± 5° F., said second polymerizing conducted utilizing a weight ratio of acrylonitrile to said first copolymer to said styrene member of about 15–30:15–35:50–70, b. between about 0 and 10 wt. percent of a metal salt selected from the group consisting of oxides and sulfides of antimony, arsenic and bismuth, c. and the remainder being polyvinyl chloride having a specific viscosity between about 0.30 and 0.6.

2. A composition in accordance with claim 1 consisting essentially of 50 wt. percent "a" and 50 wt. percent "c".

3. A composition of claim 1 consisting essentially of 50 wt. percent "a" and 50 wt. percent "c" and wherein said alkyl acrylate is ethyl acrylate, said alkylthioalkyl methacrylate is ethylthioethyl methacrylate, said styrene member is styrene, the weight ratio of acrylonitrile:ethyl acrylate:ethylthioethyl methacrylate:styrene is 25:25:50 and the weight ratio of ethylacetate:ethylthioethyl methacrylate of 93:7.

4. A composition according to claim 1 consisting essentially of 50 wt. percent "a," 50 wt. percent "c" wherein said alkyl acrylate is ethyl acrylate, said alkylthioalkyl acrylate is ethylthioethyl methacrylate, said styrene member is alphamethylstyrene, the weight ratio of acrylonitrile:ethyl acrylate:ethylthioethyl methacrylate:alpha-methylstyrene is 27:20:53, and the weight ratio of ethylacetate:ethylthioethyl methacrylate is 93:7.

5. A composition according to claim 1 consisting essentially of 50 wt. percent "a," 50 wt. percent "c" wherein said alkyl acrylate is ethyl acrylate, said alkylthioalkyl acrylate is ethylthioethyl methacrylate said styrene member is alphamethylstyrene, the weight ratio of acrylonitrile:ethyl acrylate:ethylthioethyl methacrylate:alpha-methylstyrene is 28:17:55 and the weight ratio of ethylacetate:ethylthioethyl methacrylate is 93:7.

* * * * *